United States Patent [19]

Hara et al.

[11] 4,434,932
[45] Mar. 6, 1984

[54] AIR-CONDITIONER CONTROL SYSTEM FOR AUTOMOBILES

[75] Inventors: Kiyoshi Hara, Oobu; Yasufumi Kojima, Gifu; Teiichi Nabeta, Okazaki, all of Japan

[73] Assignees: Nippondenso Co., Ltd., Kariya; Toyota Jidosha Kabushiki Kaisha, Toyota, both of Japan

[21] Appl. No.: 395,340

[22] Filed: Jul. 6, 1982

[30] Foreign Application Priority Data

Jul. 7, 1981 [JP] Japan ................. 56-106571

[51] Int. Cl.³ .................. F24F 7/00; B60H 1/00
[52] U.S. Cl. ..................... 236/49; 98/2.01; 98/121 A; 165/43
[58] Field of Search ............. 236/49; 165/43; 98/40 V, 121 A, 2.01

[56] References Cited

U.S. PATENT DOCUMENTS

| 4,364,513 | 12/1982 | Tsuzuki et al. | 98/2.01 X |
| 4,375,754 | 3/1983 | Okura | 165/43 X |
| 4,382,463 | 5/1983 | Ikebukuro | 98/2.01 X |

*Primary Examiner*—William E. Wayner
*Attorney, Agent, or Firm*—Cushman, Darby & Cushman

[57] ABSTRACT

An air-conditioner control system for an automobile includes a shifting unit for shifting the direction of flow of conditioned air supplied to the vehicle compartment between a first flow direction including the direction of an object occupant and a second flow direction excluding the direction of the object occupant. A control unit determines the shift position of the shifting unit and selects the flow direction between the first and second flow directions in response to the difference between the vehicle compartment temperature and a desired temperature and an information indicative of an ambient temperature value or an information indicative of the value of solar radiation incident to the vehicle compartment.

12 Claims, 14 Drawing Figures

1

AIR-CONDITIONER CONTROL SYSTEM FOR AUTOMOBILES

BACKGROUND OF THE INVENTION

The present invention relates to an air-conditioner control system for automobiles which changes the direction of flow of conditioned air supplied to the vehicle compartment of an automobile and controls the air conditioning of the vehicle compartment.

With automobile air-conditioners known in the art, it has been the practice so that when quick cooling is required by the occupant in the vehicle compartment at such times when the temperature inside the vehicle compartment is high, the occupant himself controls and shifts the air outlet grilles provided at the center, left and right, etc., of the vehicle compartment so as to direct the cooled air toward him, and when the compartment temperature decreases for some time the occupant again suitably shifts the air outlets provided at the center and the left and right of the compartment so as to decrease the amount of cooled air blown directly toward him and prevent any feeling of overcooling thereby air conditioning the entire interior of the vehicle compartment.

This manual control is disadvantageous in that since the center, left and right air outlets are shifted only at such times when the occupant actually feels hot, a considerable time is required before the vehicle compartment is air-conditioned stably for the occupant and this requires the occupant to shift the air outlets frequently.

SUMMARY OF THE INVENTION

With a view to overcoming the foregoing deficiencies in the prior art, it is the primary object of the invention to provide an improved air-conditioner control system for automobiles so designed that during the transitional period in the air conditioning of the interior of a vehicle compart the flow direction of air is controlled in accordance with the difference between the vehicle compartment temperature and a desired temperature in the course of the air conditioning control, whereby the feeling of air conditioning on the part of the occupants is adjusted to a pleasing feeling during the transition from the transitional condition to the steady-state condition of the air conditioning system.

In accordance with one form of the invention, the transitional condition in the course of the temperature control is discriminated in accordance with the difference between the vehicle compartment temperature and a desired temperature so that during the transitional condition air shifting means is controlled in a manner that the flow of the conditioned air is mainly directed toward the object occupant and as the transitional condition shifts to the stable condition the air shifting means is controlled in a manner that the flow direction of the conditioned air is diverted in a progressive manner or continuously from the direction of the object occupant.

In accordance with another form of the invention, the control system receives a specified control command in addition to the temperature difference for discriminating the transitional condition. In other words, while the direction of flow of the conditioned air is determined according to the temperature difference, there are cases where the object occupant still desires that more air be blown directly toward him even after the temperature control system has come to the stable condition and the invention is designed to meet this requirement.

The specified control command may for example be generated through a manual switch operated by the occupant or the command may be generated automatically in accordance with any other air conditioning factor than the temperature difference of the vehicle compartment, such as, the value of solar radiation or outside air temperature.

In accordance with the invention, when a specified control command is generated, the air shifting means is controlled in such a manner that the flow direction of the conditioned air is fixed in a given direction or the flow direction determined in accordance with the temperature difference is corrected to vary continuously or in a stepwise manner.

DESCRIPTION OF THE PREFERRED EMBODIMENTS

In accordance with a preferred embodiment of the invention, a plurality of ventilating air outlets are extended from an air conditioning unit incorporating a temperature adjusting device and air guide vanes and servo motors are provided for the air outlets such that the flow direction of air can be continuously shifted from the directions of the seats of the vehicle occupants to those diverted from the directions of the seats.

The position of each servo motor to be controlled is adjusted by a command signal generated from a digital computer so as to coincide with the desired position stored in the internal memory of the digital computer. The digital computer computes and stores the desired position in accordance with the vehicle compartment temperature and a desired temperature.

A manual switch, an outside temperature sensor and a solar radiation sensor are connected to the digital computer to provide a specified control command and the digital computer discriminates the states of the switch and the sensors.

If the result shows that the manual switch is on, the servo motors are each moved to a predetermined desired position irrespect of other temperature conditions. In this case, in accordance with the embodiment the servo motors are positioned so that the conditioned air flow is directed more to the object occupant than other places.

Where the manual switch is not operated, if the temperature outside the vehicle compartment exceeds a predetermined value, the desired position of the servo motors are corrected so as to increase the conditioned air directed to the occupant. This has the effect of imparting a draft feeling to the occupant during hot weather, e.g., the summer daytime.

Also, with the manual switch not operated, if the intensity of solar radiation exceeds a predetermined value, the desired position of the servo motors are corrected so as to increase the conditioned air directed to the occupant. Thus, this serves to lessen the sense of hotness felt by the occupant due to the solar radiation.

It is desirable that each of the outside air sensor and the solar radiation sensor is designed so that a physical quantity is converted to a continuous electric signal. The digital computer receives these electric signals and determines whether they are each greater than the predetermined value. Also, these electric signals from the sensor are used in the digital computer to determine the amount of adjustment by the temperature adjusting device of the air conditioning unit.

The digital computer is designed to sequentially effects these control modes in accordance with a preliminarily stored control program.

A description will now be made of an embodiment of an air conditioner control system for automobiles according to the invention, which is designed to effectively operate with respect to the object occupants who sit in all the seats of an automobile.

Figure 1:
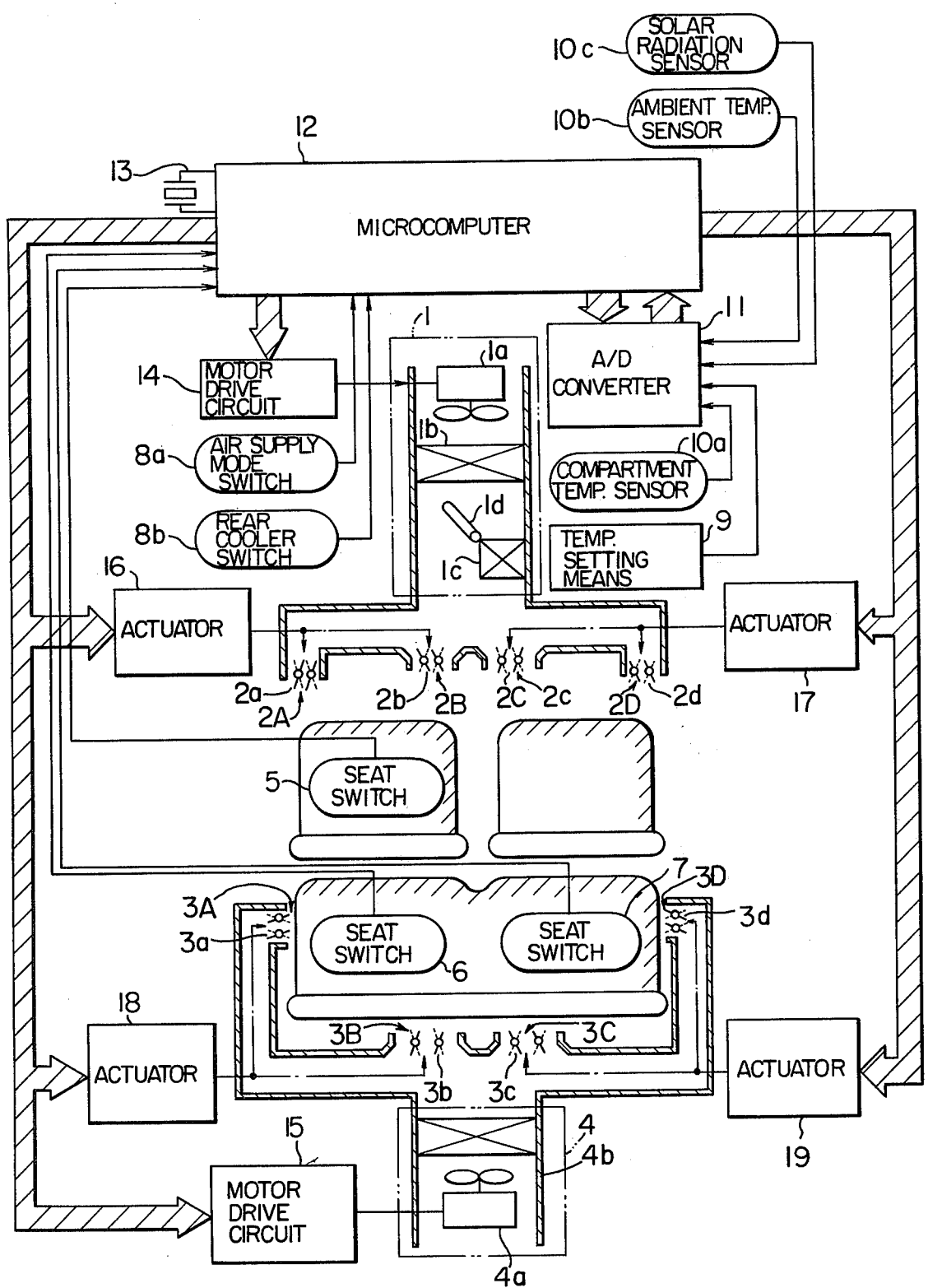
FIG. 1 is a schematic diagram showing the overall construction of an embodiment of the present invention.

FIG. 1 is a schematic diagram showing the overall construction of the embodiment of the invention.

In the Figure, numeral 1 designates an air conditioning unit comprising a blower motor 1a for selectively introducing the air from inside and outside the vehicle compartment through a known type of air induction device and supplying the air to the vehicle compartment, an evaporator 1b for cooling and passing therethrough the air supplied from the blower motor 1a, a heater core 1c for introducing the engine cooling water and passing the air heated by the heat of the engine cooling water, an air mixing damper 1d for adjusting the proportion of the air introduced into the heater core 1c through the evaporator 1b and effecting the temperature adjustment, etc.

Numerals 2B and 2C designate front center air outlets, and 2A and 2D front side air outlets. These air outlets are referred to as ventilating air outlets. These air outlets are provided with flow direction changing plate groups 2a, 2b, 2c and 2d, respectively, for changing the direction of air blown into the front part of the vehicle compartment. Numerals 3B and 3C designate rear center air outlets, and 3A and 3D rear side air outlets. These air outlets are provided with flow direction changing plate groups 3a, 3b, 3c and 3d for changing the direction of air blown into the rear part of the vehicle compartment. The flow direction changing plate groups of the front and rear center air outlets 2 and 3, respectively, are rotatably supported so as to be continuously shifted from the solid line position (the position not directed toward the occupant seats) up to the broken line position (the position directed toward the occupant seats) and thus they form blowing direction shifting means.

Although not shown, the air conditioner unit 1 comprises, in addition to the front air outlets 2A to 2D, defrosting air outlets and heating air outlets which are arranged parallel to the former. Manually operated dampers, for example, are provided to supply the conditioned air through the defrosting air outlets and the heating air outlets.

Numeral 4 designates a rear cooler unit (air conditioning unit) comprising a blower motor 4a, an evaporator 4a, etc. Numerals 5, 6 and 7 designate seat switches which each closes and generates a seat signal when the occupant sits in the assistant driver's seat, rear left seat and rear right seat, respectively.

Numeral 8a designates an air supply mode switch which is manually operated to force the flow direction changing plate groups into the broken line positions. The switch 8a is mounted on the instrument panel in front of the driver's seat, for example. Numeral 8b designates a rear cooler switch mounted on the instrument panel in front of the driver's seat or at any other position where it can be operated by the rear seat occupants and adapted to be closed and generate a rear cooler signal to operate the rear cooler. Numeral 9 designates temperature setting means for setting the desired temperature, which is mounted on the instrument panel or the like and operated manually by the occupants to set the desired temperature. Numeral 10a designates a compartment temperature sensor which is mounted for example on the instrument panel in the vehicle compartment to detect the typical temperature inside the vehicle compartment. Numeral 10b designates an ambient temperature sensor for detecting the temperature outside the vehicle compartment. Numeral 10c designates a solar radiation sensor comprising a photo-electric conversion device and mounted on the instrument panel. Each of the sensors 10a and 10b comprises a thermistor, and specially connected the solar radiation sensor 10c is a time constant circuit for providing a response delay. Numeral 11 designates an A/D converter for converting an analog signal to a digital signal and it successively converts the signals from the sensors 10a, 10b and 10c and the preset temperature signal from the temperature setting means 9 to digital signals.

Numeral 12 designates a digital computer for executing the digital computational operations by software in accordance with a predetermined control program and it comprises a microcomputer. The computer 12 is connected to a crystal unit 13 of several MHz and it also comes into operation in response to the supply of a stabilized voltage from a stabilized power supply circuit (not shown) which produces a stabilized voltage of 5 volts from the voltage supplied from the vehicle battery. The microcomputer 12 comprises a read only memory (ROM) storing the control program which determines the computing procedure, a central processing unit (CPU) for sequentially reading the control program from the ROM and executing the corresponding computational operations, a memory (RAM) which temporarily stores various data associated with the computational operations of the CPU so as to be read out by the CPU, a clock generator including the crystal unit 13 to generate reference clock pulses for the various computational operations, and an input/output (I/O) circuit section for the various signals as its principal component parts. The operations performed by the microcomputer 12 results in the generation of command signals for controlling the speed of the blower motors 1a and 4a and flow direction changing command signals for the flow direction changing plate groups 2a, 2b, 2c and 2d of the front air outlets 2A to 2D and the flow direction changing plate groups 3a, 3b, 3c and 3d of the rear air outlets 3A to 3D.

Figure 2:
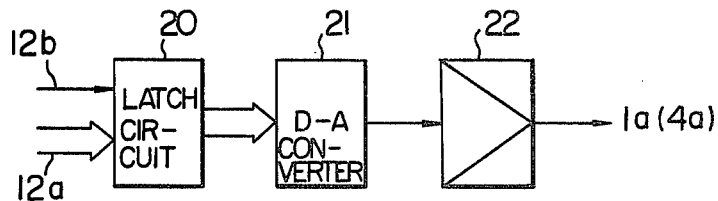
FIG. 2 is a detailed circuit diagram of the motor drive circuits and shown in FIG. 1.

Numerals 14 and 15 designates motor drive circuits for controlling the speed of the blower motors 1a and 4a, respectively, and each of the circuits 14 and 15 comprises, as shown in FIG. 2, a latch circuit 20 responsive to a latch command pulse signal 12b to latch a blower speed indicative digital command signal 12a from the microcomputer 12, a D/A converter 21 for converting the latched digital signal to an analog signal and an amplifier circuit 22 for amplifying the analog signal, thereby controlling the speed of the blower motor. Numerals 16, 17, 18 and 19 designate shifting actuators (servo motors) forming driving means which actuate and shift the flow direction changing plate groups 2a, 2b, 2c and 2d of the front air outlets 2A to 2D and the flow direction changing plate groups 3a, 3b, 3c and 3d of the rear air outlets 3A to 3D.

Each of these shifting actuators is responsive to the command from the microcomputer 12 to simultaneously actuate the two flow direction changing plate groups. For example, the actuator 16 actuates the changing plate groups 2a and 2b in association with each other. When the changing plate groups 2a and 2b are moved to the broken line positions, the air from the air conditioning unit 1 is blown toward the front left seat or its occupant through the front center air outlet 2B and also the air is blown toward the front left seat through the side air outlet 2A. When the actuator 16 is operated, the amount of its movement determines the position of the changing plate groups 2a and 2b, respectively, between the broken line position and the solid line position, so that when they are moved to the solid line positions, the direction of the air from the side air outlet 2A is shifted from the direction of the seat in the direction of the window and simultaneously the amount of the air blown toward the front left seat via the center air outlet 2B is practically reduced to zero and directed toward the center where there is no occupant. The other shifting actuators 17, 18 and 19 each operates in the similar manner so that when the amount of movement or stroke is small (the solid line position), the amount of air blown directly toward the seated occupant is practically reduced to zero, and the amount of air blown toward the seat increases in proportion to an increase in the stroke (in the direction of the broken line position).

Figure 3:
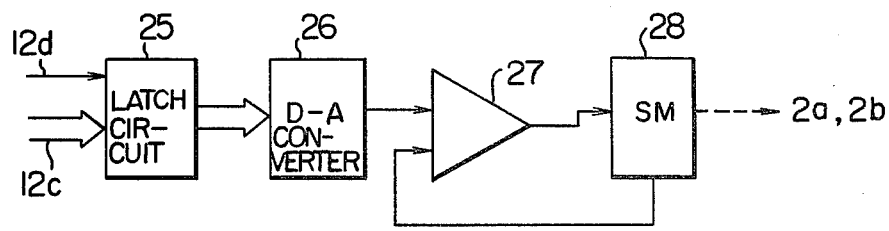
FIG. 3 is a detailed circuit diagram of the shifting actuators and shown in FIG. 1.

FIG. 3 shows the construction of each shifting actuator comprising a latch circuit 25 responsive to a latch command pulse 12d to latch a stroke indicative digital command signal 12c from the microcomputer 12, a D/A converter 26 for converting the latched digital signal to an analog signal, an error amplifier 27 and a servo motor 28 which is driven by the output signal of the error amplifier 27 while feeding the stroke back to the error amplifier 27, thereby controlling the amount of shift of the flow direction changing plate groups 2a and 2b (as the plate groups 2c, 2d, 3a, 3b, 3c and 3d) in accordance with the output stroke of the servo motor 28.

With the construction described above, the operation of the embodiment will now be described with reference to the operational flow charts shown in FIGS. 4 to 7.

Figure 4:
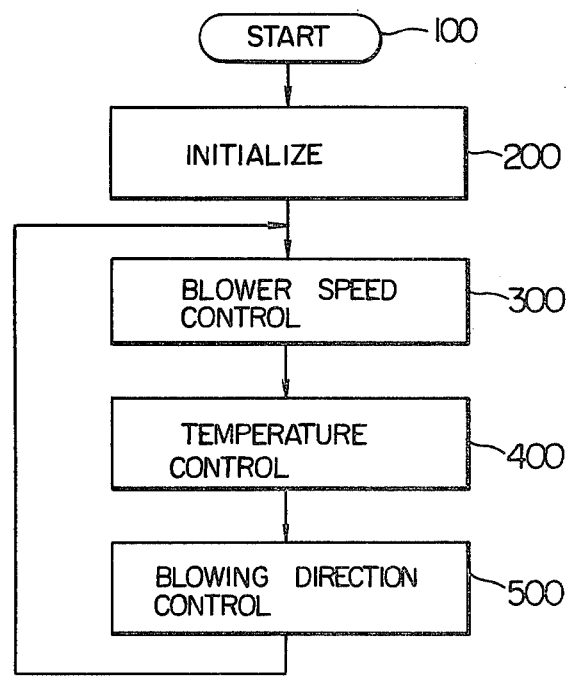
FIG. 4 is an operational flow chart showing the overall computational operations performed by the microcomputer shown in FIG. 1 in accordance with a control program.
Figure 5:
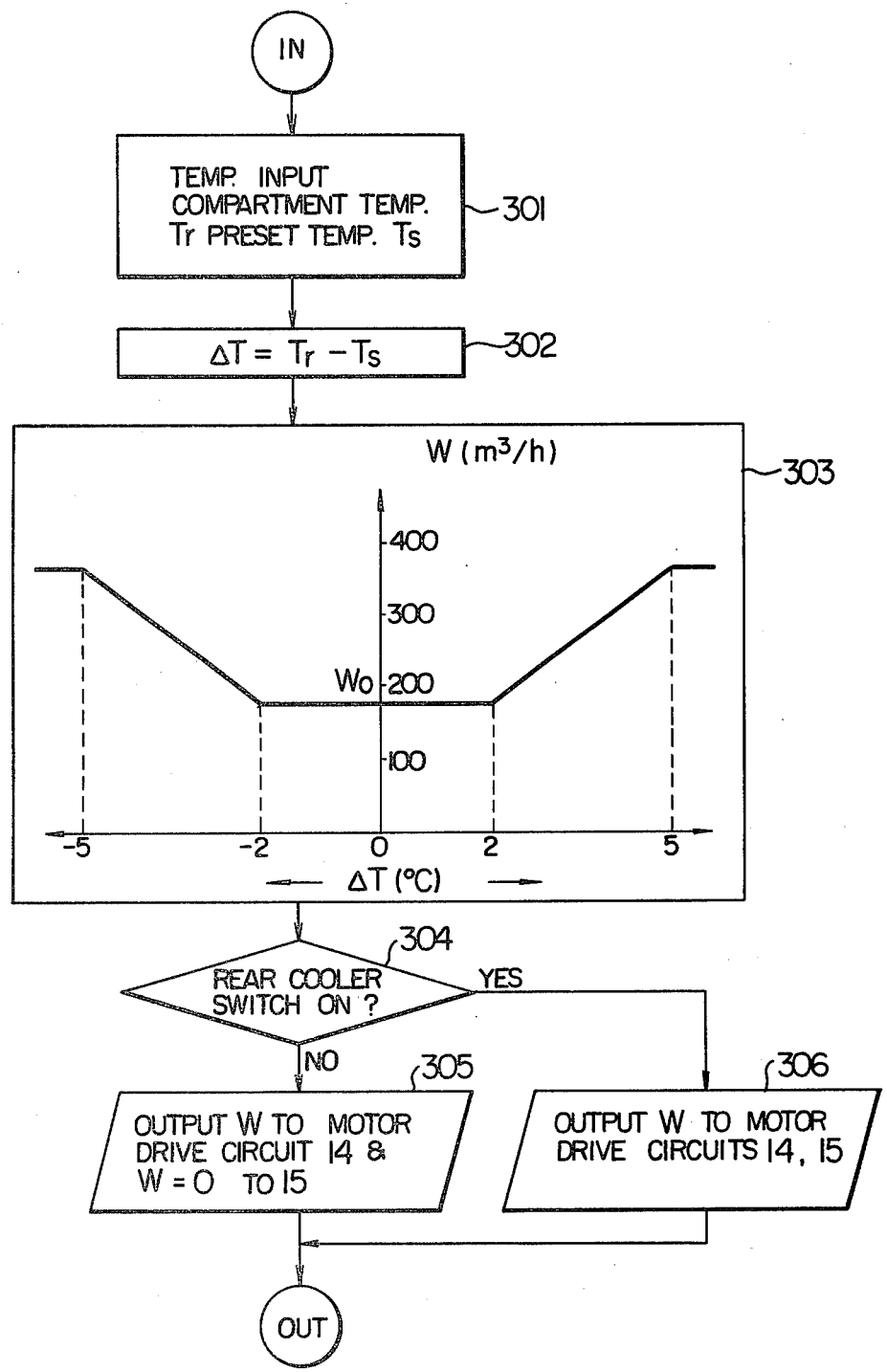
FIG. 5 is an operational flow chart showing the detailed computational operations of the blower speed control routine shown in FIG. 4.
Figure 6:
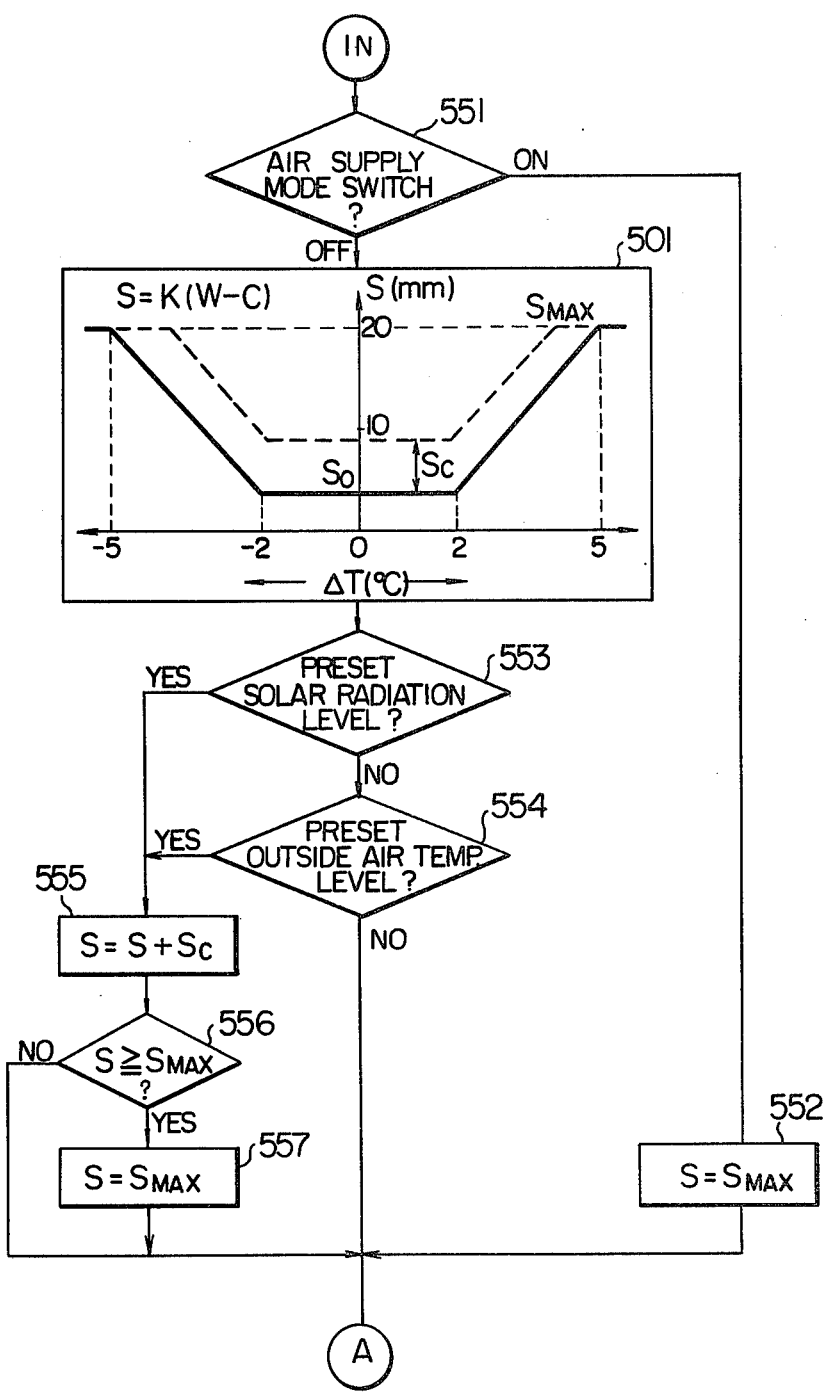
FIGS. 6 and 7 are a series of operational flow charts showing the detailed computational operations of the blowing direction control routine shown in FIG. 4.
Figure 7:
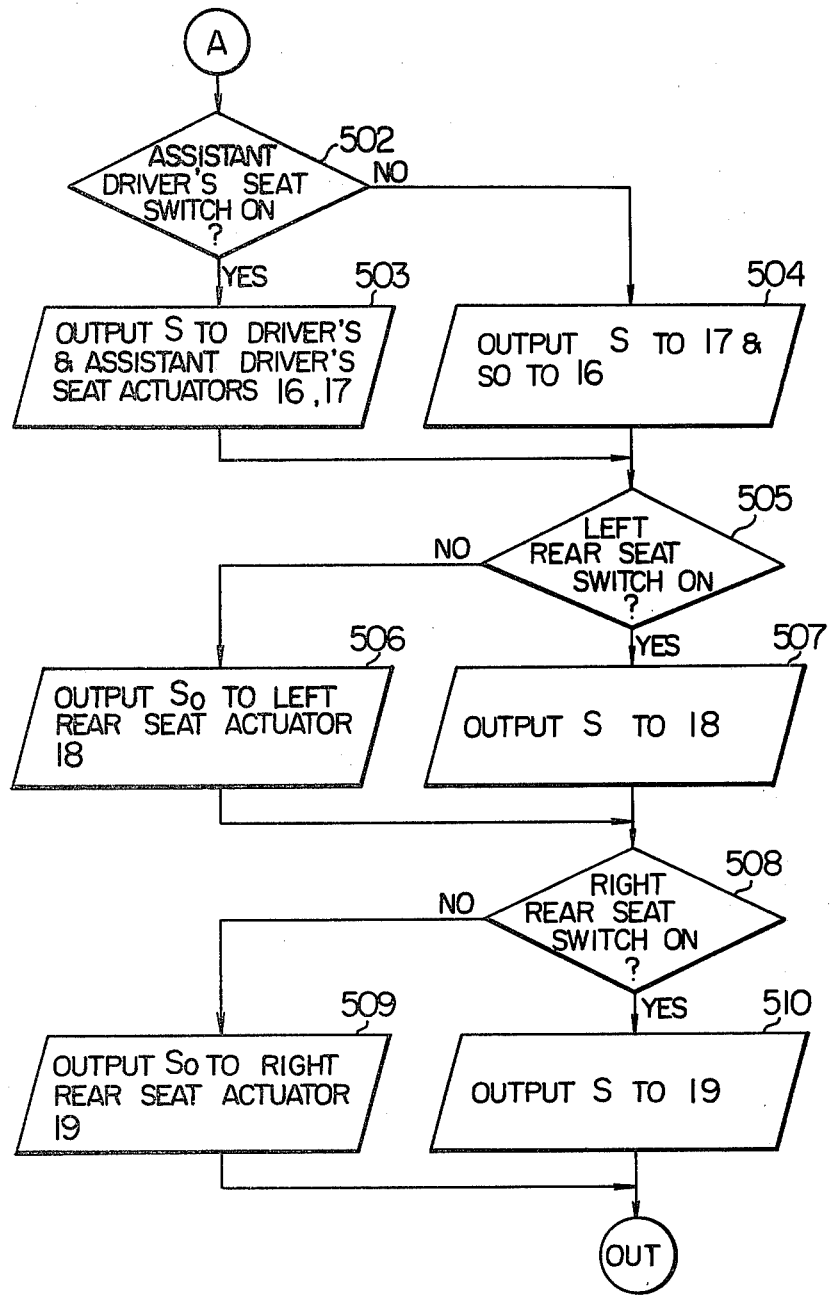

The operational flow chart of FIG. 4 shows the overall computational operations of the microcomputer 12 according to the control program, and the operational flow chart of FIG. 5 shows the detailed computational operations of the blower speed control routine shown in FIG. 4. The operational flow charts of FIGS. 6 and 7 show the detailed computational operations of the blowing direction control routine shown in FIG. 4.

When the air conditioner switch (not shown) is closed in a vehicle equipped with this control system, the microcomputer 12 is supplied with the stabilized voltage from the stabilized power supply circuit which is supplied with the voltage from the vehicle battery through the ignition switch (not shown), so that the microcomputer 12 comes into operation and performs the operations according to the control program at intervals of about several hundreds msec.

More specifically, the computational operations are started by a start step 100 of FIG. 4 and then the processing proceeds to an initialization steps 200 so that the registers, counters, latches, etc., in the microcomputer 12 are set to the initial states necessary for starting the operations and also an initialization signal is applied to the circuits controlled by the microcomputer 12 to set the circuits to their initial states. After the completion of the initialization, a transfer is made to a blower speed control routine 300.

The blower speed control routine 300 performs the necessary computational operations for determining the wind rate corresponding to the difference between the vehicle compartment temperature and the preset temperature in response to the compartment temperature signal from the compartment temperature sensor 10 and the preset temperature signal from the temperature setting means 9 and controlling the speed of the blower motor 1a as well as the speed of the blower motor 4a if the rear cooler switch 8b is on, and then a transfer is made to the next temperature control routine 400.

The temperature control routine 400 performs the necessary computational operations for temperature controlling purposes, i.e., the position control of the air mixing damper 1d, the on-off control of the compressor which is not shown, the switching control of an inside/outside air change-over damper which is not shown in response to the compartment temperature, the preset temperature, the outside air temperature and the intensity of solar radiation, and then a transfer is made to a blowing direction control routine 500.

The blowing direction control routine 500 performs the necessary computational operations for controlling the driving means of the flow direction changing plate groups 2a, 2b, 2c and 2d of the front air outlets 2A to 2D and the flow direction changing plate groups 3a, 3b, 3c and 3d of the rear air outlet 3A to 3D in response to the difference between the compartment temperature and the preset temperature and the states of the signals from the seat switches 5, 6 and 7, the air supply mode switch 8a and the rear cooler switch 8b, and then a return is made to the blower speed control routine 300. Thereafter, the processing including from the blower speed control routine 300 to the blowing direction control routine 500 is performed repeatedly.

Next, the detailed computational operations of the blower speed control routine 300 in the above-described repeated processing will be described with reference to the operational flow chart of FIG. 5.

With the blower speed control routine 300, the computational operations are started by a temperature input step 301 so that the compartment temperature signal from the compartment temperature sensor 10 and the preset temperature signal from the temperature setting means 9 are successively inputted as digital signals via the A/D converter 11 and then a transfer is made to a difference computing step 302. The difference computing step 302 computes a difference $\Delta T$ from an equation $\Delta T = T_r - T_s$ in accordance with the compartment temperature $T_r$ and the preset temperature $T_s$ inputted by the temperature input step 301 and then transfers to the next wind rate setting step 303. The difference $\Delta T$ computed by the difference computing step 302 is stored at a given location of the RAM in the microcomputer 12. The wind rate setting step 303 determines a desired wind rate W from the characteristic relation shown in the Figure in accordance with the difference $\Delta T$. The characteristic relation is preliminarily stored in the RAM of the microcomputer 12 so that the numerical range of the difference $\Delta T$ is seached and a coefficient of the linear function corresponding to the numerical range is read out, thereby computing the wind rate W corresponding to the difference $\Delta T$. Then, a transfer is made to the next rear cooler decision step 304 which in turn determines whether there is the rear cooler signal from the rear cooler switch 8b so that if there is the rear cooler signal, its decision becomes YES. If there is no rear cooler signal, the decision becomes NO and a transfer is made to an output step 305. The output step 305 applies a command signal corresponding to the wind rate W computed by the wind rate computing step 303 only to the motor drive circuit 14, thereby completing the processing of the blower speed control routine 300.

On the contrary, if the decision of the rear cooler step 304 is YES, a transfer is made to an output step 306 so that a command signal corresponding to the wind rate W computed by the wind rate computing step 303 is applied to the motor drive circuits 14 and 15, respectively, and the processing of the blower speed control routine 300 is completed.

Next, the detailed computational operations of the blowing direction control routine 500 will be described with reference to the operational flow charts of FIGS. 6 and 7.

The blowing direction control routine 500 determines the position of the flow direction changing plate groups 2a, 2b, 2c, 2d, 3a, 3b, 3c and 3d, respectively, in accordance with the difference $\Delta T$. A changing plate group position setting step 501 first computes a stroke S of the shifting actuators 16 to 19 in accordance with the characteristic relation shown in the Figure. This characteristic relation is a similar curve to the wind rate W curve and the stroke S is computed by applying the wind rate data W as $S = K(W - C)$. Here, K is a proportionality constant, and C is a constant corresponding to the minimum wind rate $W_o$.

Note that when the value of $\Delta T$ is large, the stroke S assumes its maximum value and the flow direction changing plate groups each assumes a position such as the previously mentioned broken line position which blows the air concentrically toward the seat. When the value of $\Delta T$ is small, the stroke S assumes its minimum value $S_{O(o)}$ and the plate group assumes a blowing position which is substantially diverted from the direction of the seat as the solid line position.

The position setting step 501 is adapted for use in the normal operating mode so that when a specified control command is recognized, the step 501 is not used completely due to the processing of steps 551 through 557 or the resulting stroke S is corrected by the latter steps.

In other words, when the step 551 determines that the air supply mode switch 8a is closed, the position setting step 501 is passed and the step 552 selects the maximum stroke $S_{MAX}$.

If the air supply mode switch 8a is not closed, the processing proceeds through the position setting step 501 so that the step 553 determines whether the value of a solar radiation indicative electric signal is greater than a predetermined value. If the intensity of the solar radiation is smaller than the predetermined value, the step 554 determines whether the value of an outside air temperature indicative electric signal is greater than a predetermined value. If any one of these decisions is affirmative, the step 555 adds a fixed value Sc to the stroke S obtained by the position setting step 501. The steps 556 and 557 adjust the stroke S such that the result of the addition does not exceed the maximum stroke $S_{MAX}$. In FIG. 6, the stroke characteristic after the addition is indicated by the broken line at the step 501.

In this way, the stroke of each actuator is determined according to selected one of the three ways depending on whether the air supply mode switch 8a is closed and the values of the solar radiation and the outside air temperature.

To operate the actuators 16, 17, 18 and 19, an assistant driver's seat directing decision step 502 first determines whether there is the seat signal from the seat switch 5 mounted in the assistant driver's seat so that if there is no seat signal, the decision becomes NO and a transfer is made to a driver's seat directing command step 504. Thus, a command signal is applied to the driver's seat actuator 17 to operate it and provide the stroke S obtained by the step 501 and 551 through 557 and a transfer is made to a left rear seat directing decision step 505. On the contrary, if the decision of the assistant driver's seat directing decision step 502 is YES, a transfer is made to a driver's seat and assistant driver's seat directing command step 503 and a command signal is applied to each of the actuators 16 and 17 for the driver's seat and the assistant driver's seat so that the actuators 16 and 17 are operated to provide the stroke S, and a transfer is made to the left rear seat directing decision step 505.

The left rear seat directing decision step 505 determines whether there is the seat signal from the seat switch 6 so that if there is no seat signal, the decision becomes NO and a step 506 applies the minimum value $S_o$ to the left rear seat actuator 18. Then, a transfer is made to a right rear seat directing decision step 508. On the other hand, if the decision of the step 505 is YES, a transfer is made to a left rear seat directing command step 507 so that a command signal is applied to the left rear seat actuator 18 to operate it and provide the stroke S and a transfer is made to a right rear seat directing decision step 508.

The right rear seat directing decision step 508 determines whether there is the seat signal from the seat switch 7 so that if there is no seat signal, the decision becomes NO and a transfer is made to a right rear seat directing command step 509. Thus, a command signal is applied to the right rear seat actuator 19 to cause it to provide the minimum stroke $S_o$ and the actuator 19 is operated, thereby completing the processing of the blowing direction control routine 500. If there is the right rear seat signal, the decision of the step 508 becomes YES and a transfer is made to a right rear seat directing command step 510. Thus, a command signal is applied to the actuator 19 and the actuator 19 is operated to provide the stroke S, thereby completing the processing of the blowing direction control routine 500.

Next, the overall operation of the air-conditioner control system under various conditions will be described.

The operation will be described first with reference to a case where two occupants are sitting in the front seats under a high compartment temperature condition with the vehicle compartment temperature being higher than the preset temperature by more than 5° C. In this case, due to the high compartment temperature condition, when the air conditioner switch is closed as soon as the vehicle is started, the microcomputer 12 is brought into operation by the stabilized voltage supplied thereto from the stabilized power supply circuit. As a result, its processing is started by the start step 100 of FIG. 4, proceeds to the initialization routine 200 causing it to perform the initialization operations and then proceeds to the blower speed control routine 300.

With the blower speed control routine 300, the temperature input step 301 inputs the compartment temperature $T_r$ and the preset temperature $T_s$ and transfers to the difference computing step 302 which in turn computes the difference $\Delta T$. In this case, the temperature inside the vehicle compartment is high and thus the value of the difference $\Delta T$ exceeds 5° C. As a result, the wind rate W computed by the following wind rate setting step 303 assumes the maximum value of about 370 m³/h. Then, a transfer is made to the next rear cooler decision step 304 so that if the rear cooler switch 8 is closed, the decision becomes YES and a transfer is made to the output step 306. Thus, a command signal corresponding to the computed wind rate W or about 370 m³/h is applied to the motor drive circuits 14 and 15 and one cycle of the processing of the blower speed control routine 300 is completed. As a result, the blower motor 1a is operated at a high speed.

Then, a transfer is made to the next temperature control routine 400 which in turn performs the necessary computational operations such that in accordance with the current temperature control signals the angular position of the air mixing damper 1d is controlled and the compressor is turned on thereby supplying the cooled air and then transfers to the next blowing direction control routine 500. With the blowing direction control routine 500, the stroke computed by the flow direction changing plate group position setting step 501 assumes the maximum value of 20 mm since the value of the difference $\Delta T$ is greater than 5° C.

Then, a transfer is made to the next assistant driver's seat directing decision step 502 so that since the occupant is sitting in the assistant driver's seat, its decision becomes YES and transfers to the driver's seat and assistant driver's seat directing command step 503. Thus, a command signal is applied to the actuators 16 and 17 so that each of the actuators is operated to provide the stroke of 20 mm and the air is blown concentrically toward the driver's seat and the assistant driver's seat, respectively.

Then, a transfer is made to the left rear seat directing decision step 505 so that since only the two occupants are sitting in the front seats, its decision becomes NO and it transfers to the next right rear seat directing decision step 508 whose decision in turn becomes NO. Thus, a transfer is made to the left and right rear seat directing command steps 506 and 509, respectively, so that a minimum stroke $S_o$ command signal is applied to the actuators 18 and 19, respectively, and these actuators are operated to direct the air from the rear cooler toward other places than the rear seats irrespective of the operation of the rear cooler. Thus, one cycle of the processing of the blowing direction control routine 500 is completed and a return is made to the blower speed control routine 300.

Thereafter, the processing of the blower speed control routine 300 through the blowing direction control routine 500 is repeated at intervals of several hundreds msec so that the flow direction changing plate group 2b at the front center air outlet 2B is directed toward the driver's seat and the flow direction changing plate group 2a at the front side air outlet 2A is directed toward the assistant driver's seat and the maximum amount of the cooled air produced through the maximum rotation of the blower motor 1a is blown toward the driver's seat and the assistant driver's seat, thereby providing the desired cooling through the concentrated air supply. In this case, the air supply from the rear cooler is zero.

Then, as the vehicle compartment temperature gradually decreases so that the difference between it and the preset temperature becomes less than 5° C., the wind rate W computed by the wind rate setting step 303 of the blower speed control routine 300 is decreased gradually. As a result, the amount of the cooled air supplied to the vehicle compartment is decreased gradually. Simultaneously, the stroke S of the flow direction changing plate groups is decreased gradually from the maximum value so that the blowing directions are gradually changed from the concentrated air supply so as to divert from the directions of the occupants. When the difference $\Delta T$ between the compartment temperature $T_r$ and the preset temperature $T_s$ becomes less than 2° C., the wind rate W is reduced to the minimum value $W_o$ of about 180 m³/h and also the stroke of the flow direction changing plate groups is set to the minimum value $S_o$ (about 4 mm), thereby air conditioning the whole interior of the vehicle compartment without practically blowing the air directly toward the occupants.

On the other hand, where the outside air temperature or the solar radiation is greater than a predetermined value, the stroke S is corrected or increased from the value determined in correspondence to the temperature difference $\Delta T$ and thus the air is directly blown in a considerable amount toward the occupants even though the amount toward the occupants even though the difference $\Delta T$ is less than 2° C.

When the air supply mode switch is closed, the stroke S is held at the maximum value $S_{MAX}$ and the concentrated air supply in the direction of the occupants is provided.

Where the number of the occupants is 3 or 4, upon closing the rear cooler switch 8b the air blown toward the rear seats is adjusted in accordance with the seat position(s) through the flow direction changing plate groups 3a, 3b, 3c and 3d in the similar manner as the front seats.

Further, the concentrated air supply which directs the conditioned air toward each object occupant is effected not only under high compartment temperature conditions but also under low compartment temperature conditions. In other words, when the vehicle compartment temperature is lower than a preset temperature by more than a given temperature difference, warm air is blown concentrically toward each object occupant in accordance with the characteristic relation shown at the step 501.

The present invention is not intended to be limited to the above-described embodiment and the invention can be embodied with the following modifications.

Figure 8:
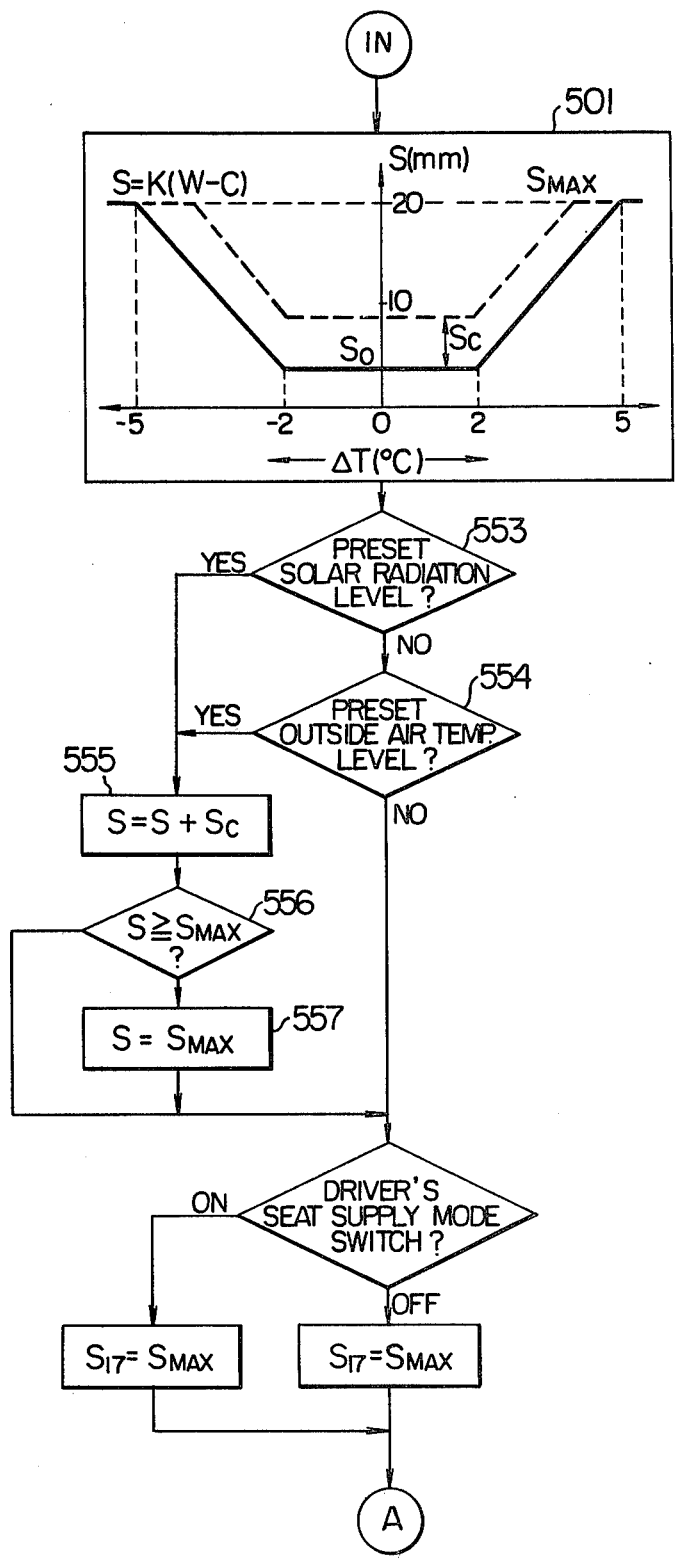
FIG. 8 is a modification of the operational flow chart shown in FIG. 6.
Figure 9:
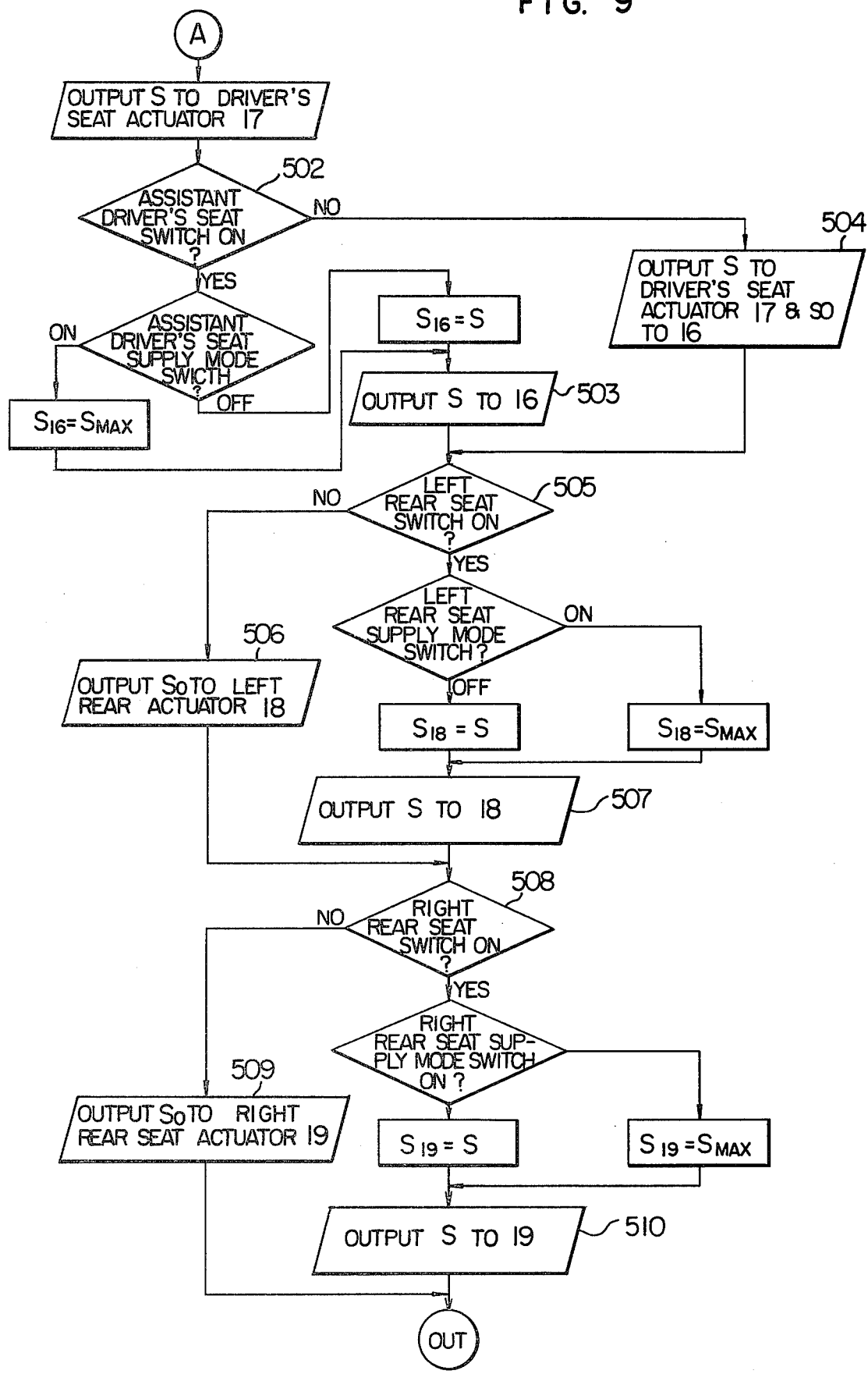
FIG. 9 is a modification of the operational flow chart shown in FIG. 7.

(1) As shown in FIGS. 8 and 9, the seats may each be provided with its own air supply mode switch 8a so that in response to a signal from the closed switch only particular one of the actuators is provided with the maximum stroke $S_{MAX}$ so as to vary the amount of air directed toward the particular seat alone. To accomplish this, it is only necessary to insert, for example, between the steps 505 and 507 a decision step which determines whether the air supply mode switch provided at the left rear seat is closed and a command step which applies a maximum stroke indicative signal $S_{MAX}$ to the left rear seat actuator 18 when the decision indicates that the switch is closed.

Symbol S represents a basic stroke (a shift position), and $S_{16}$, $S_{17}$, $S_{18}$ and $S_{19}$ strokes applied to the actuators 16 to 19, respectively. This modification shows that when the air supply mode switch (not shown) at each seat is closed, the maximum value $S_{MAX}$ is selected as the stroke of the corresponding actuator and the basic stroke S itself is adopted as the stroke of each actuator associated with the air supply mode switch which is not closed.

Figure 10:
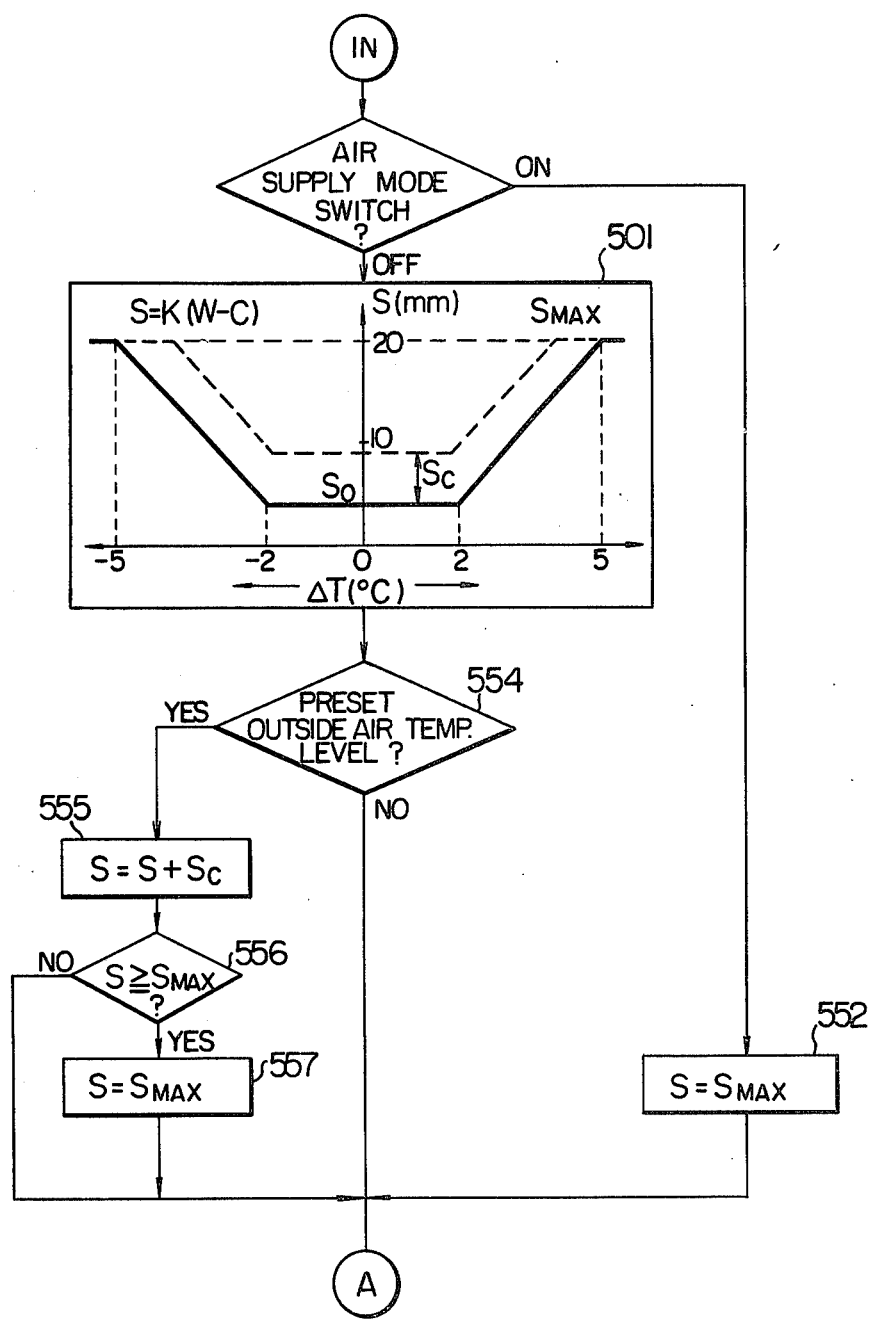
FIG. 10 is another modification of the operational flow chart shown in FIG. 6.
Figure 11:
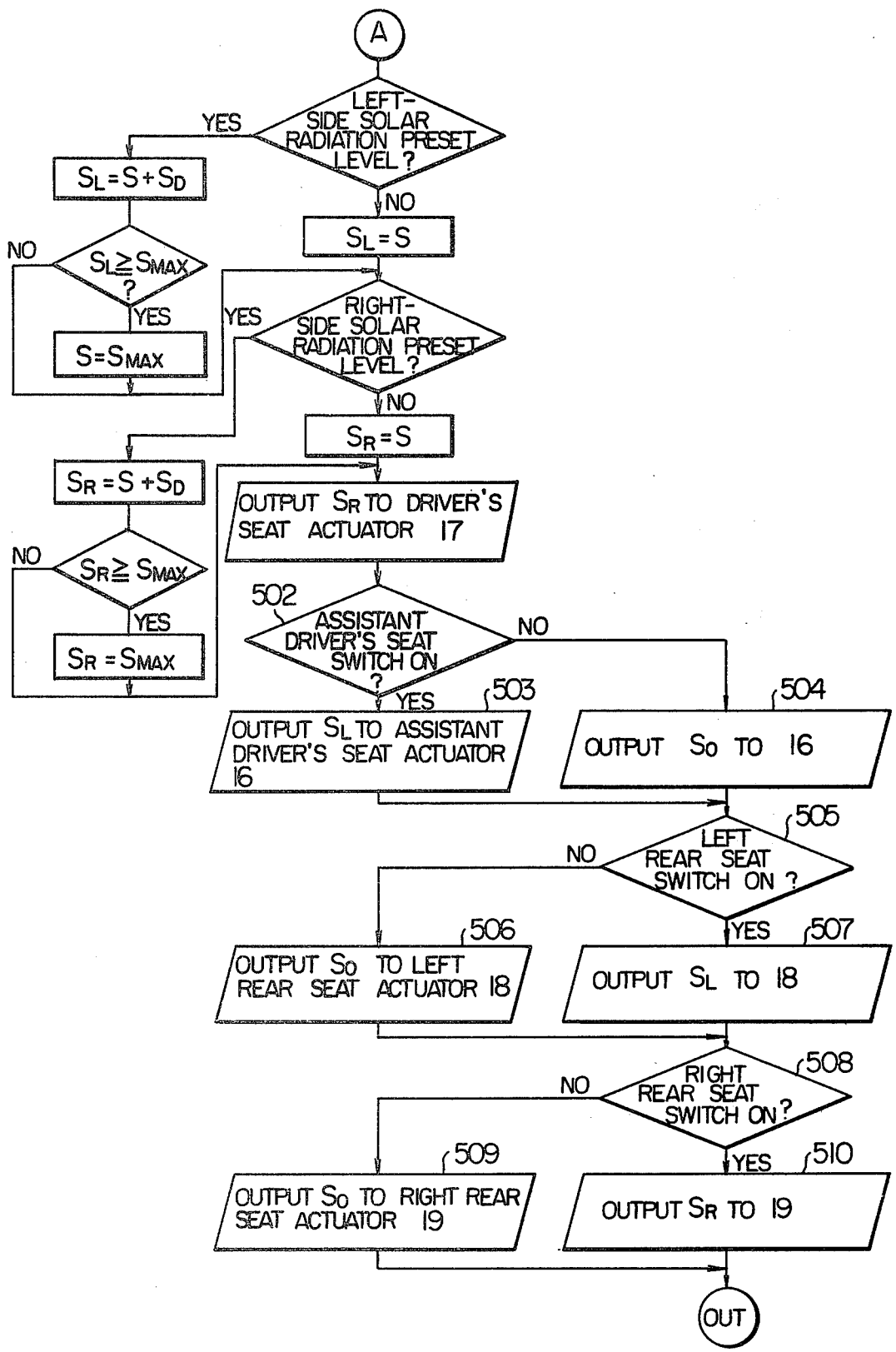
FIG. 11 is another modification of the operational flow chart shown in FIG. 7.

(2) As shown in FIGS. 10 and 11, a plurality of solar radiation sensors 10c having different sensing angles for the incident radiation to the vehicle may be provided so that when a greater amount of solar radiation than a predetermined value is detected by any one of the solar radiation sensors 10c at its particular incident angle, only the stroke of the actuator associated with the seat positioned to receive the incident radiation is corrected.

The basic stroke S is determined in consideration of the outside air temperature. The solar radiation sensors (not shown) include one which detects the solar radiation incident to the left side of the vehicle compartment another which detects the solar radiation incident to the right side of the vehicle compartment. When the incident radiation to the left side exceeds a given level, a stroke $S_L$ of the left actuator is corrected to a value which is the basic stroke S plus a fixed value $S_D$, and the stroke $S_L$ is equal to the basic stroke S when the incident radiation is below the given level. A stroke $S_R$ of the right actuator is determined similarly in accordance with the incident radiation to the right side.

In this modification, the right stroke $S_R$ is applied to the driver's seat actuator 17 and the left stroke $S_L$ is applied to the assistant driver's actuator 16 (the right-hand steering wheel car).

Figure 12:
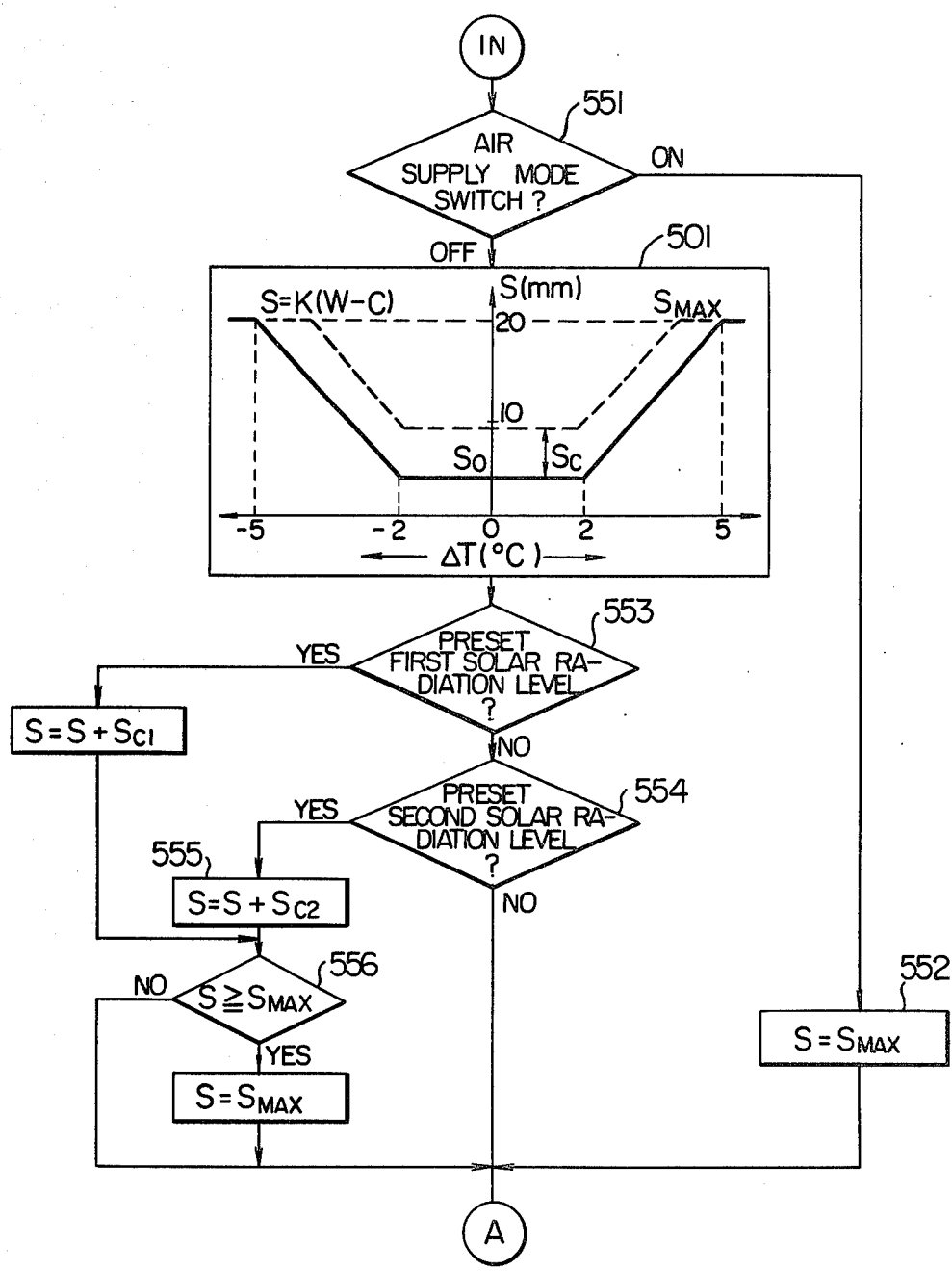
FIGS. 12, 13 and 14 are still another modifications of the operational flow chart shown in FIG. 6.

(3) As shown in FIG. 12, the value $S_c$ added by the step 555 needs not be a fixed value and it may be varied in accordance for example with the intensity of the solar radiation or the value of the outside air temperature.

It is determined whether the solar radiation intensity is higher than a first level, intermediate between the first level and a second level or below the second level. If the solar radiation intensity is higher than the first level, a fixed value $S_{c1}$ is added to the basic stroke S. If the solar radiation intensity is intermediate between the first and second levels, a fixed value $S_{c2}$ ($S_{c1} > S_{c2}$) is added to the stroke S. If the solar radiation intensity is below the second level, the basic stroke S itself is used.

Figure 13:
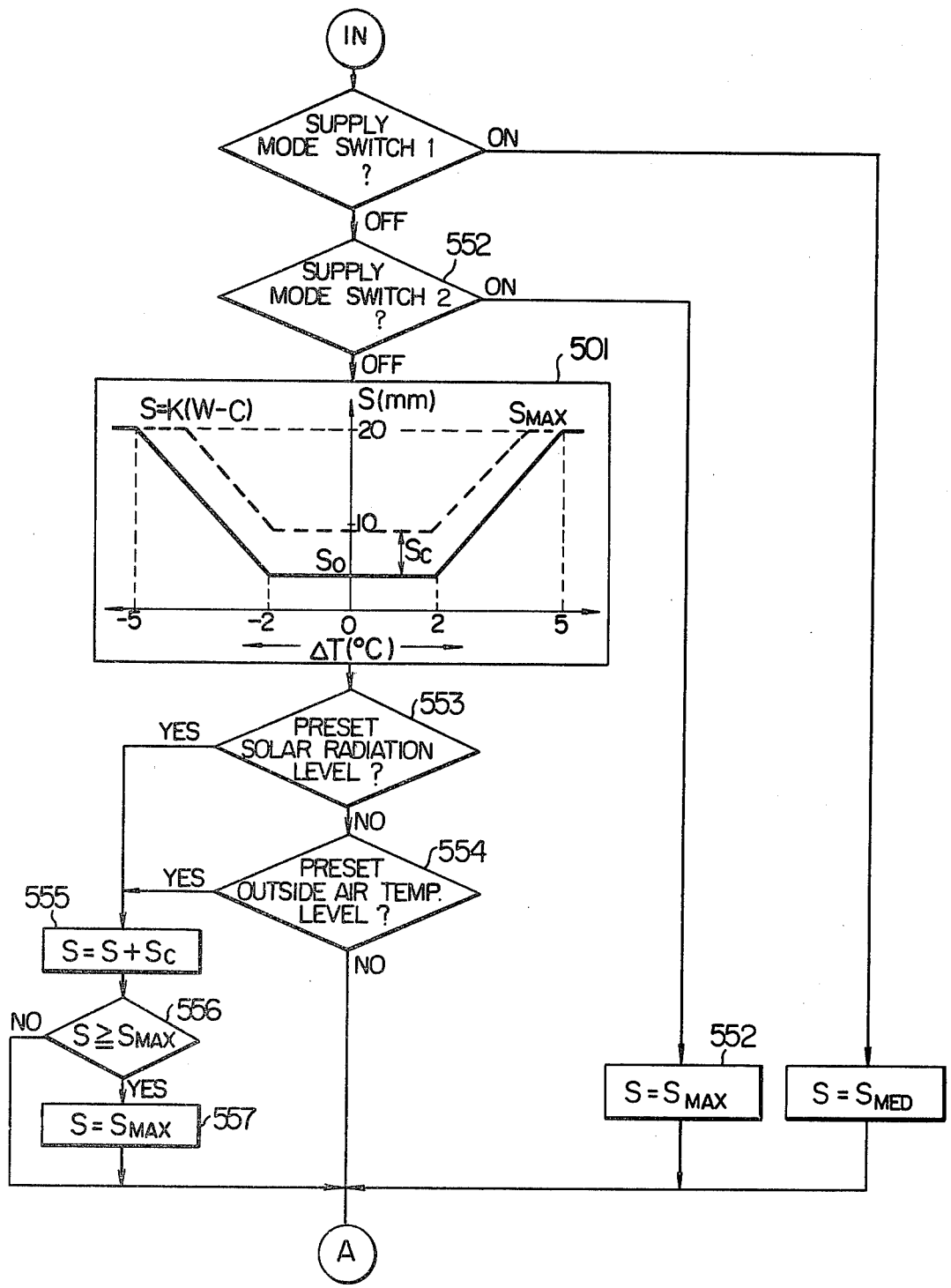

(4) As shown in FIG. 13, the maximum value $S_{MAX}$ set by the step 552 may be replaced by a predetermined different value. Also, if necessary, a plurality of air supply mode switches may be provided to selectively set different values by the switches.

For example, first and second air supply mode switches (not shown) are provided so that the actuator stroke S is set to the maximum value $S_{MAX}$ when the first air supply mode is closed and the stroke S is set to an intermediate value $S_{MED}$ when the second air supply mode switch is closed. There is a relation $S_o > S_{MED} > S_{MAX}$.

Figure 14:
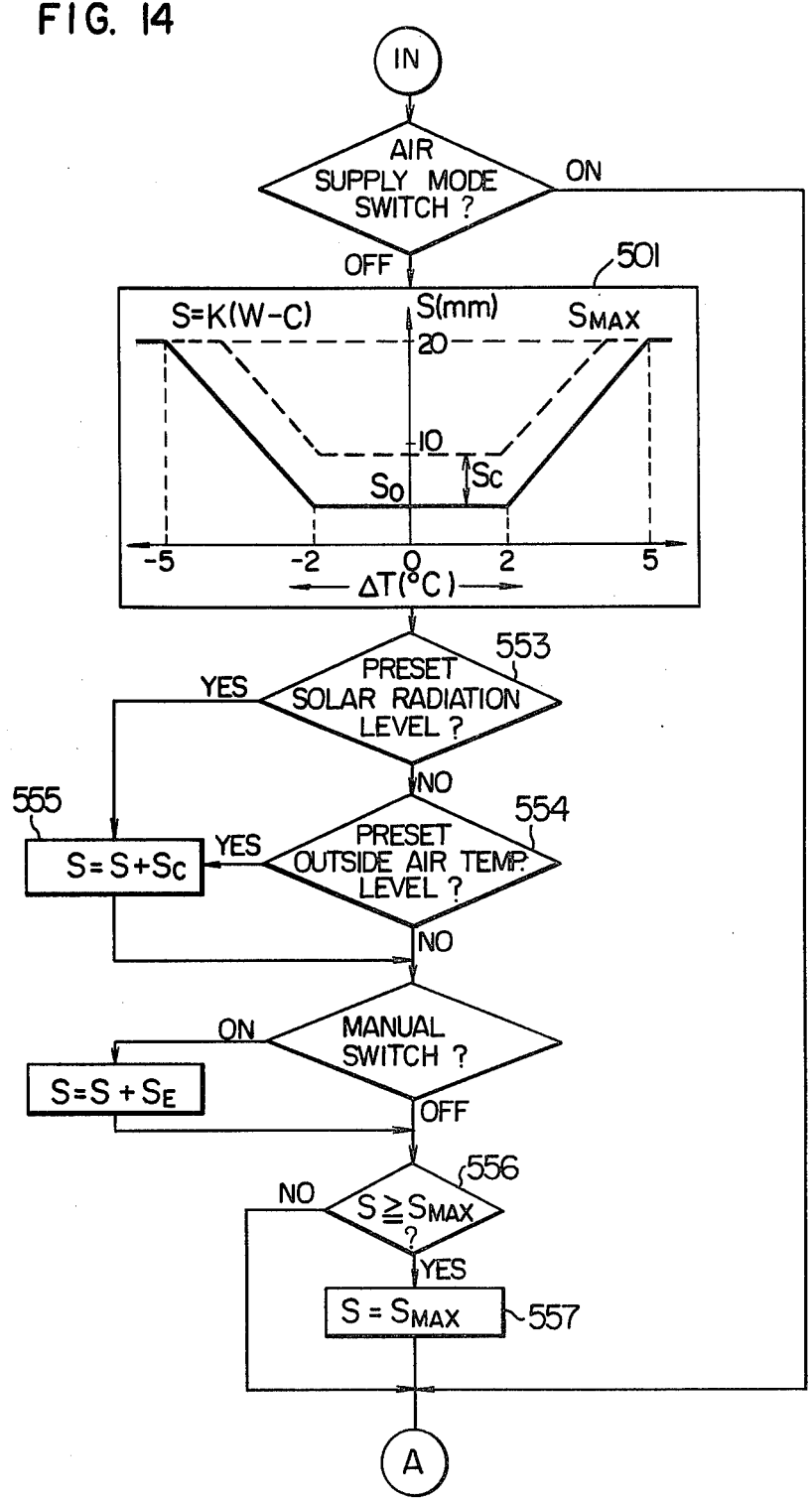

(5) As shown in FIG. 14, the invention may be embodied in an apparatus for manually changing blowing direction characteristics. In other words, since the difference $\Delta T$ versus stroke S characteristic varies depending on whether the step 555 is performed as shown by way of example at the step 501 of FIG. 6, it is only necessary to utilize this fact and replace the steps 553 and 554 or add thereto a step which determines whether a manual switch (not shown) is closed and transfers to the step 555.

Thus there is provided a manual switch (not shown) so that a fixed value $S_E$ is added to the actuator stroke S when the manual switch is closed.

(6) In addition to the above-described embodiments in which the air supply is continuously controlled between the concentrated air supply and the overall supply mode for all the occupants, it is possible to apply the invention to control the air supply only with respect to a particular occupant, e.g., the driver and use a known type of manual change-over mechanism so as to control the air supply with respect to the other occupants through their manual control.

(7) While, in the above-described embodiment, the air conditioning unit 1 is of the so-called air mixing type, it is possible to use a so-called reheating type comprising an evaporator, a heater core positioned downstream of the evaporator and a valve mechanism for adjusting the amount of the engine cooling water passed through the heater core.

(8) While, in the above-described embodiments, the amount of air blown toward the occupants is decreased proportionately as the vehicle compartment temperature is stabilized, the amount of air may be decreased progressively or in a stepwise manner.

We claim:

1. An air-conditioner control system for an automobile which supplies a stream of air conditioned by an air-conditioner to a vehicle compartment of the automobile such that the temperature in the vehicle compartment approaches a desired temperature, said system comprising:

shifting means whereby the direction of flow of said conditioned air stream supplied to said vehicle compartment is gradually shifted continuously or, progressively between a first flow direction including the direction of at least one object occupant and a second flow direction excluding the direction of said object occupant;

compartment temperature sensor means for generating an electric signal indicative of an actual air temperature in said vehicle compartment;

temperature setting means for generating an electric signal to adjust a desired temperature of a vehicle compartment air temperature to be controlled;

signal generating means operable by said occupant to generate an electric signal indicative of a given control command; and control means responsive to said electric signals from said compartment temperature sensor means, said temperature setting means and said signal generating means for determining a shift position of said shifting means in accordance with a control amount related to said compartment temperature and said desired temperature and said control command and applying an electric control signal indicative of said shift position to said shifting means thereby selecting the flow direction of said conditioned air stream between said first and second flow directions said control means maintaining said shift position at a given position in response to said control command irrespective of said control amount and determining said shift position in accordance with said control amount when said control command ceases to exist.

2. A system according to claim 1, wherein said signal generating means generates a single significant signal, and wherein said control means is responsive to said significant signal to determine said shift position such that the flow direction of said conditioned air stream is maintained in said first flow direction.

3. A system according to claim 1, wherein said signal generating means generates a plurality of significant signals, and wherein said control means is responsive to said significant signals to determine said shift position such that the flow direction of said conditioned air stream is selected from a plurality of flow directions predetermined in correspondence to said plurality of significant signals.

4. An air-condition control system for an automobile which supplies a stream of air conditioned by an air-conditioner to a vehicle compartment of the automobile such that the temperature in the vehicle compartment approaches a desired temperature, said system comprising:

shifting means whereby the direction of flow of said conditioned air stream supplied to said vehicle compartment is gradually shifted continuously or progressively between a first flow direction including the direction of at least one object occupant and a second flow direction excluding the direction of said object occupant;

compartment temperature sensor means for generating an electric signal indicative of an actual air temperature in said vehicle compartment;

temperature setting means for generating an electric signal to adjust a desired temperature of a vehicle compartment air temperature to be controlled;

signal generating means operable by said occupant to generate an electric signal indicative of a given control command;

control means responsive to said electric signals from said compartment temperature sensor means, said temperature setting means and said signal generating means for determining a shift position of said shifting means in accordance with a control amount related to said compartment temperature and said desired temperature and said control command and applying an electric control signal to said shifting means thereby selecting the flow direction of said conditioned air stream between said first and second flow directions, said control means establishing a reference position of said shift position in accordance with said control amount and corrects said reference position in accordance with said control command.

5. An air-conditioner control system for an automobile which supplies a stream of air conditioned by an air-conditioner such that the temperature in the vehicle compartment approaches a desired system, said system comprising:

shifting means whereby the direction of flow of said conditioned air stream supplied to said vehicle compartment is gradually shifted continuously or progressively between a first flow direction including the direction of at least one object occupant and a second flow direction excluding the direction of said object occupant;

compartment temperature sensor means for generating an electric signal indicative of an actual air temperature in said vehicle compartment;

temperature setting means for generating an electric signal to adjust a desired temperature of a vehicle compartment air temperature to be controlled;

solar radiation sensor means for generating an electric signal indicative of an intensity of solar radiation incident to said vehicle compartment; and control means responsive to said electric signals from said compartment temperature sensor means, said temperature setting means and said solar radiation sensor means for determining a shift position of said shifting means in accordance with a control amount related to said vehicle compartment temperature and said desired temperature and the intensity of said solar radiation and applying an electric control signal to said shifting means thereby selecting the flow direction of said conditioned air stream between said first and second flow direction, said control means establishing a reference position of said shift position in accordance with said control amount and correcting said reference position in accordance with the intensity of said solar radiation.

6. A system according to claim 5, wherein said control means compares the intensity of said solar radiation with a predetermined value whereby when said solar radiation intensity is greater than said predetermined value, the flow direction of said conditioned air stream is corrected to approach said first flow direction by a given amount with respect to said reference position of said shift position.

7. A system according to claim 5, further comprising ambient temperature sensor means for generating an electric signal indicative of a temperature of air outside said vehicle compartment and applying the same to said control means, and wherein said control means corrects said reference position of said shift position in accordance with the intensity of said solar radiation and said outside air temperature.

8. An air-conditioner control system for an automobile which supplies a stream of air conditioned by an air-conditioner to a vehicle compartment of the automobile such that the temperature in the vehicle temperature approaches a desired temperature, said system comprising:

shifting means whereby the direction of flow of said conditioned air stream supplied to said vehicle compartment is gradually shifted continuously or progressively between a first flow direction including the direction of at least one object occupant and a second flow direction excluding the direction of said object occupant;

compartment temperature sensor means for generating an electric signal indicative of an actual air temperature in said vehicle compartment;

temperature setting means for generating an electric signal to adjust a desired temperature of a vehicle compartment air temperature to be controlled;

ambient temperature sensor means for generating an electric signal indicative of a temperature of air outside said vehicle compartment; and control means responsive to said electric signals from said compartment temperature sensor means, said temperature setting means and said outside air sensor means for determining a shift position of said shifting means in accordance with a control amount related to said vehicle compartment temperature and said desired temperature and said outside air temperature and applying an electric control signal to said shifting means thereby selecting the flow direction of said conditioned air stream between said first and second flow directions, said control means establishing a reference position of said shift position in accordance with said control amount and correcting said reference position in accordance with said outside air temperature.

9. A system according to claim 8, wherein said control means compares said outside air temperature with a predetermined value whereby when said outside air temperature is greater than said predetermined value, the flow direction of said conditioned air stream is corrected to approach said first flow direction by a predetermined amount with respect to said reference position of said shift position.

10. An air-conditioner control system for an automobile which supplies a stream of air conditioned by an air-conditioner to a vehicle compartment of the automobile through a first and a second air outlet such that the temperature in the vehicle compartment approaches a desired temperature, said system comprising:

first shifting means whereby the direction of flow of said conditioned air supplied to said vehicle compartment through said first air outlet is gradually shifted continuously or progressively between a first flow direction including the direction of a first object occupant and a second flow direction excluding the direction of said first object occupant;

second shifting means whereby the direction of flow of said conditioned air supplied to said vehicle compartment through said second air outlet is gradually shifted continuously or progressively between a third flow direction including the direction of a second object occupant and a fourth flow direction excluding the direction of said second object occupant;

compartment temperature sensor means for generating an electric signal indicative of an actual air temperature in said vehicle compartment;

temperature setting means for generating an electric signal to adjust a desired temperature of a vehicle compartment air temperature to be controlled;

signal generating means operable by said occupants to generate electric signals indicative of first and second control commands; and control means responsive to said electric signals from said compartment temperature sensor means, said temperature setting means and said signal generating means for determining a shift position of each of said first and second shifting means in accordance with a control amount related to said vehicle compartment temperature and said desired temperature and said first and second control commands and applying an electric control signal to each of said first and second shifting means thereby selecting the flow direction of said conditioned air stream between said first and second flow directions and between said third and fourth flow directions, respectively, said control means maintaining the shift position of said first shifting means at a given position in response to said first control command irrespective of said control amount, determining the shift position of said first shifting means in accordance with said control amount upon extinction of said first control command, maintaining the shift position of said second shifting means at a given position in response to said second control command irrespective of said control amount, and determining the shift position of said second shifting means in accordance with said control amount upon extinction of said second control command.

11. An air-conditioner control system for an automobile which supplies a stream of air conditioned by an air-conditioner to a vehicle compartment of the automobile through a first and a second air outlet such that the temperature in the vehicle compartment approaches a desired temperature, said system comprising:

first shifting means whereby the direction of flow of said conditioned air supplied to said vehicle compartment through said first air outlet is gradually shifted continuously or progressively between a first flow direction including the direction of a first object occupant and a second flow direction excluding the direction of said first object occupant;

second shifting means whereby the direction of flow of said conditioned air supplied to said vehicle compartment through said second air outlet is gradually shifted continuously or progressively between a third flow direction including the direction of a second object occupant and a fourth flow direction excluding the direction of said second object occupant;

compartment temperature sensor means for generating an electric signal indicative of an actual air temperature in said vehicle compartment;

temperature setting means for generating an electric signal to adjust a desired temperature of a vehicle compartment air temperature to be controlled;

solar radiation sensor means for generating electric signals indicative of an intensity of a first solar radiation incident to around said first object occupant and an intensity of solar radiation incident to around said second object occupant in said vehicle compartment; and control means responsive to said electric signals from said compartment temperature sensor means, said temperature setting means and said solar radiation sensor means for determining a shift position of each of said first and second shifting means in accordance with a control amount related to said vehicle compartment temperature and said desired temperature and said first and second solar radiation intensities and applying an electric control signal to each of said first and second shifting means thereby selecting the flow direction of said conditioned air stream between said first and second flow directions and between said third and fourth flow directions, respectively, said control means establishing a reference position of the shift position of said first and second shifting means, respectively, in accordance with said control amount, correcting the shift position of said first shifting means in accordance with said first solar radiation intensity and correcting shift position of said second shifting means in accordance with said second solar radiation intensity.

12. A system according to claim 11, wherein said control means compares said first solar radiation intensity with a predetermined value so as to correct the shift position of said first shifting means to approach said first flow direction by a given amount with respect to said reference position thereof when said first solar radiation intensity is greater than said predetermined value, and wherein said control means compares said second solar radiation intensity with a given value so as to correct the shift position of said second shifting means to approach said third flow direction by a given amount with respect to said reference position thereof when said second solar radiation intensity is greater than said given value.

* * * * *